United States Patent [19]

Sugihara et al.

[11] Patent Number: 4,505,763
[45] Date of Patent: Mar. 19, 1985

[54] HEAT-TREATING METHOD OF WELD PORTION OF PIPING SYSTEM AND HEATING COIL FOR THE HEAT TREATMENT

[75] Inventors: Isao Sugihara, Hitachi; Wataru Sagawa, Mito; Tsukasa Ikegami; Tasuku Shimizu, both of Hitachi, all of Japan

[73] Assignee: Hitachi, Ltd., Tokyo, Japan

[21] Appl. No.: 391,305

[22] Filed: Jun. 23, 1982

[30] Foreign Application Priority Data

Jul. 8, 1981 [JP] Japan .................. 56-105534

[51] Int. Cl.³ .............................. C21D 1/30
[52] U.S. Cl. .................... 148/127; 266/129; 219/10.43; 219/10.79
[58] Field of Search ............... 266/129; 148/127, 150, 148/154, 157; 219/10.79, 10.43, 10.57, 8.5, 10.49 R, 535; 376/277

[56] References Cited

U.S. PATENT DOCUMENTS 2,249,909 7/1941 Pasarev .......................... 219/10.79
2,303,408 12/1942 Soderholm ..................... 219/10.79

FOREIGN PATENT DOCUMENTS 739755 6/1980 U.S.S.R. ......................... 219/10.79

OTHER PUBLICATIONS

Boerger et al., "Load Coil for RF Coupling", IBM Technical Disclosure Bulletin, vol. II, No. 7, Dec. 1968.
Ishikawjnia-Harenia, Eng. Rev., vol. 18, No. 1, Jan. 1978.

Primary Examiner—L. Dewayne Rutledge
Assistant Examiner—Robert L. McDowell
Attorney, Agent, or Firm—Antonelli, Terry & Wands

[57] ABSTRACT

Herein disclosed are a method of heat-treating a weld zone of a piping system, in which the outer wall of a pipe is heated by means of a heating coil, while a coolant is present in said pipe, to establish a temperature difference between the inner and outer walls of said pipe thereby to prevent the weld zone of said pipe from corroding and cracking due to stress, and a heating coil therefor. The aforementioned heating coil is wound on the parent tube and the pipe welding desk generally concentrically thereof thereby to heat substantially uniformly all over the region of said weld zone.

21 Claims, 14 Drawing Figures

HEAT-TREATING METHOD OF WELD PORTION OF PIPING SYSTEM AND HEATING COIL FOR THE HEAT TREATMENT

BACKGROUND OF THE INVENTION

1. Field of the Invention

The present invention relates to a method of heat-treating a piping system by heating a pipe with the use of high-frequency waves and a heating coil to be used for the heat treatment, and more particularly to a piping system heat-treating method and a heating coil which are suitable for the case in which the heating coil used has its shape such as its sectional shape abruptly changed as at a parent pipe and a weld zone of a pipe welding desk.

2. Description of the Prior Art

A piping used in nuclear, heat power or chemical plants is formed into a long piping system by jointing straight tubes, curved tubes or other tubes by the welding process. In recent years, however, since there is a tendency that a nuclear power plant, for example, is used at a high temperature and under a high pressure, there arises a fear that the stress to be generated in such piping may come close to the yield stress of a material used. On the other hand, the piping is plastically worked and welded to prepare a piping system. The tensile residual stress established in the piping as a result of those two processes is superposed upon a repeated stress generated during the runnihg operation of the plant such as a repeated thermal stress thereby to generate a high stress. Especially in case a corrosive fluid flows through a pipe as at a pipe of austenite stainless steel which is used in the piping of a boiling-water type nuclear power plant, it is necessary to take the corrosion fatigue into consideration, too. As a method for preventing such piping system from corroding and cracking due to stress, there has been proposed a piping system heat-treating method, as is disclosed in U.S. Pat. No. 4,229,235, for example, in which the outer wall of a pipe is heated, with a coolant existing in the pipe, to establish a temperature difference between the inner and outer walls of the pipe thereby to yield the inner wall to tension and the outer wall to compression. FIG. 1 shows the arrangement, in which a piping 1 having straight pipes 1A and 1B of an equal diameter arranged coaxially of each other has a high-frequency induction heating coil 3 arranged around a weld zone 2 thereof. In this heat-treating method, a coolant such as cooling water for a reactor in case the nuclear power plant, for example, is filled in the pipe, and a heating coil is wound on the outer wall of the pipe in the vicinity of the weld zone of the pipe. That coil is energized to generate a magnetic field. The pipe has its outer circumference heated but its inside temperature not elevated to a high level because of the existence of the coolant so that a temperature difference is established between the inner and outer walls of the pipe. This temperature desired is sufficient to yield the outer wall to compression and the inner wall to tension. After this heat treatment is finished in that way, the temperature of the pipe is gradually lowered so that a tensile residual stress is generated in the outer wall of the pipe whereas a compressive residual stress is generated in the inner wall of the pipe. Thanks to the generation of the compressive residual stress in the inner wall, the pipe has its corrosion fatigue strength remarkably augmented. In other words, the nuclear power plant is enabled to endure the repeated stress, which is generated as a result that the cooling water flows in the pipe during the running operation of the reactor, and to prevent the pipe from corroding and from being broken even if any corrosive fluid does exist.

There is a limit to the maximum temperature at which the plant piping to be heat-treated in the aforementioned manner can be heated. For example, in the case of the stainless steel used in the nuclear power plant, the maximum temperature at which the outer wall of the pipe can be heated is restricted to about 550° C. because of a problem of sensitiveness resulting from the heat treatment. In order to generate the compressive yield stress in the outer wall of the pipe and the tensile yield stress in the inner wall within the limit of that range, it is an important subject matter how the large temperature difference required is to be ensured while suppressing the upper limit of the heating temperature. For the purpose of satisfying that subject matter, it is necessary to heat the respective portions of the outer pipe wall, which falls within a range to be influenced by the heating coil, as uniformly as possible without allowing any portion to have excessively high and low temperatures.

The uniform temperature distribution of the outer wall of the pipe when the heating coil is used can be easily obtained according to the theory in case the coil has a simple shape. In case the coil shape is complicated, however, the distribution of the magnetic flux to be generated by the action of the electric current flowing through the coil is changed to make the temperature distribution irregular.

This irregularity in the temperature distribution is also caused by the complex coil shape in the vicinity of the weld zone of a pipe welding desk. This corresponds to the case, in which the pipe welding desk is welded to the parent pipe so that a branch pipe may be connected at a right angle to the parent pipe. In this case, the pipe shape itself becomes complex so that the coil shape is accordingly complicated. In this case, there is left a portion which is reluctant to have its temperature raised even in accordance with the change in the distribution of the magnetic flux.

A desk fitting-up weld zone is located at the boundary between the parent pipe and the pipe welding desk, and this desk has a smaller diameter than that of the parent pipe. In a recirculating piping of the nuclear power plant, for example, the parent pipe has a diameter of 28 inches, and the desk has a diameter of 4 inches and is a short pipe which is directed substantially at a right angle with respect to the parent pipe.

According to the prior art, as shown in FIGS. 2 and 3, in case the residual stress of a desk fitting-up weld zone M is to be improved, a high-frequency induction heating coil 4 is wound around a parent pipe 5 and is arranged along the circumferential side portion of a pipe welding desk 6 at the fitting portion of the desk 6. FIG. 3 is a section taken along line X—X of FIG. 2.

In this case, the high-frequency induction heating coil 4 to be arranged along the circumferential side portion of the desk 6 covers the circumferential side of the desk 6, which is in the same direction as the winding one of the aforementioned high-frequency induction heating coil 4, so that it fails to sufficiently cover the circumferential side portion which intersects the winding direction of the aforementioned high-frequency induction heating coil 4. As a result, the region P of the desk 6, as shown, becomes that which is not heated so that the a weld zone N and the weld zone M fail to have uniform temperature distributions.

In this case, moreover, it is anticipated that a complex stress due to a local heat treatment is generated in association with the solution heat treatment, water-cooled welding treatment or buttering treatment, which is adopted as a counter-measure for preventing the corrosion and crack according to the prior art. It is feared to have an adverse effect, as the case may be.

SUMMARY OF THE INVENTION

It is, therefore, an object of the present invention to provide a piping system heat-treating method, which is enabled to have such a temperature distribution as is uniform all over the weld zone even the shape of the weld zone of the piping system is uniquely changed, and a heating coil to be used for the heat treatment.

In order to achieve the above-identified object, according to the present invention, there is provided a method of heat-treating a weld zone of a piping system, in which the outer wall of a pipe is heated by means of a heating coil, while a coolant existing in said pipe, to establish a temperature difference between the inner and outer walls of said pipe thereby to prevent the weld zone of said pipe from corroding and cracking due to stress, which method is characterized in that said heating coil is wound on both a parent pipe of said piping system and a weld zone of a pipe welding desk generally concentrically thereof thereby to heat substantially uniformly all over the region of said weld zone.

DESCRIPTION OF THE PREFERRED EMBODIMENTS

The present invention will be described in the following in connection with one embodiment thereof with reference to FIGS. 4 to 6.

Figure 4:
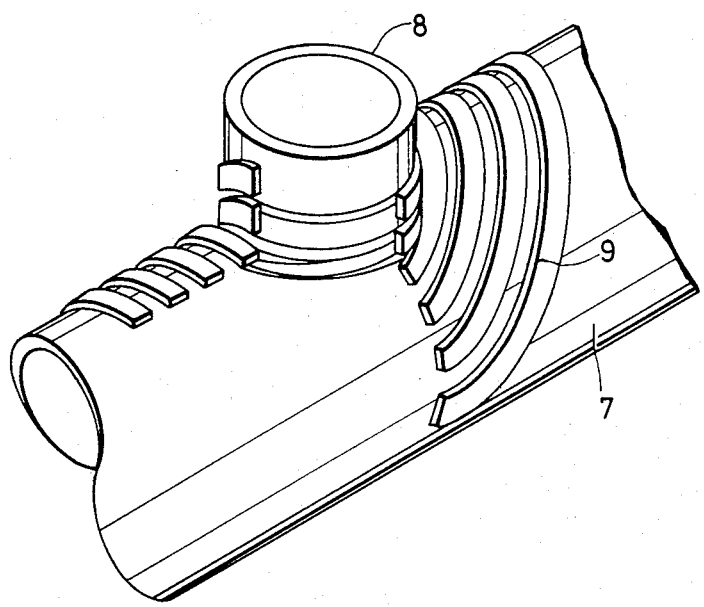
FIG. 4 is a perspective view showing one embodiment of a heating coil to be wound upon the weld zone of a piping according to the present invention with the coil being partially broken away.

In FIG. 4, a pipe welding desk 8 is welded at a right angle to a parent pipe 7. A heating coil 9 is wound in a manner to cover the parent pipe 7 and the weld zone of the desk 8. In order that the surfaces of the parent pipe 7 and the desk 8 may have substantially uniform temperature distributions, especially, that the weld zone may have a uniform temperature distribution, it is desired to wind the heating coil 9 concentrically of the weld zone M. For that desire, the coil 9 is not wound on the axis of the parent pipe 7 even on the parent pipe 7 but on the axis of the desk 8. The coil 9 may have any sectional shape such as a square, circular or elliptical shape but is desired to be hollow. In order that a large high-frequency current may flow, the coil 9 itself has to be cooled down. For this necessity, the coil 9 is made so hollow that cooling water may flow therethrough to prevent the coil 9 from being burned.

Figure 5:
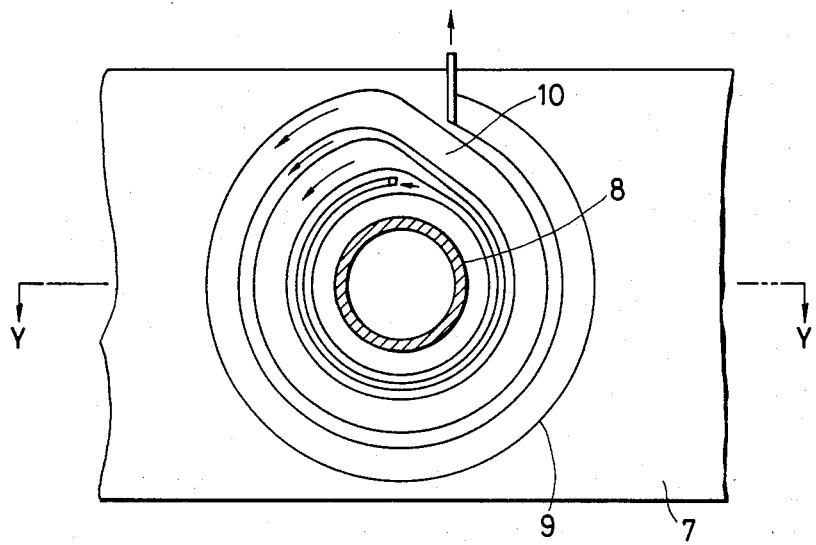
FIG. 5 is similar to FIG. 4 but is taken in the axial direction of the pipe welding desk.

FIG. 5 shows the state at which the coil 9 is wound concentrically of the desk 8. At a stepped-down portion 10, the direction of the current is abruptly turned at a portion of the coil 9, in which turns are transferred from one to another.

Figure 1:
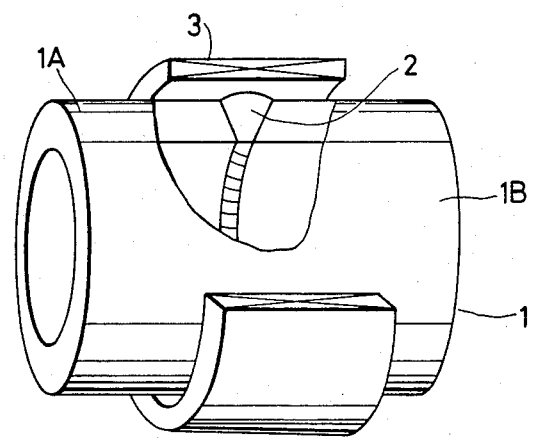
FIG. 1 is a partially sectional view showing the state at which a heating coil is attached to a straight pipe and a weld zone of a straight pipe.
Figure 2:
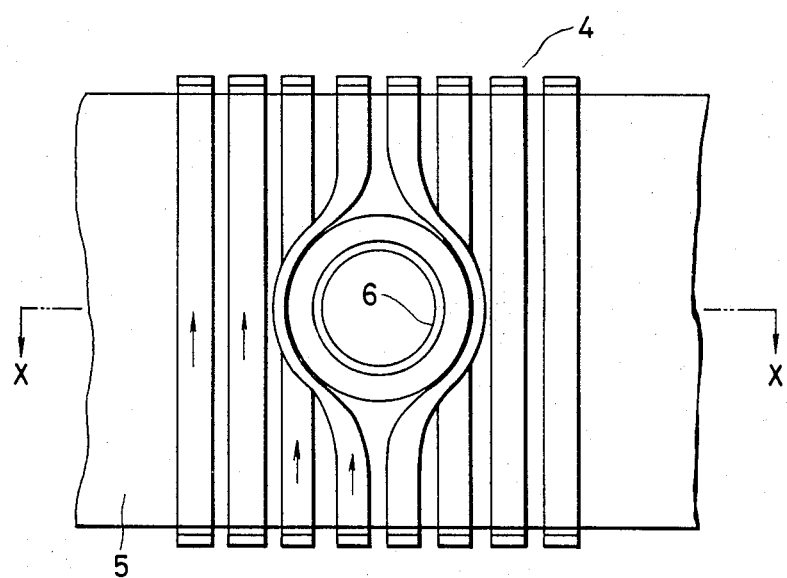
FIG. 2 is a view showing the construction, in which the heating coil is attached to the desk fitting-up weld zone according to the prior art.
Figure 3:
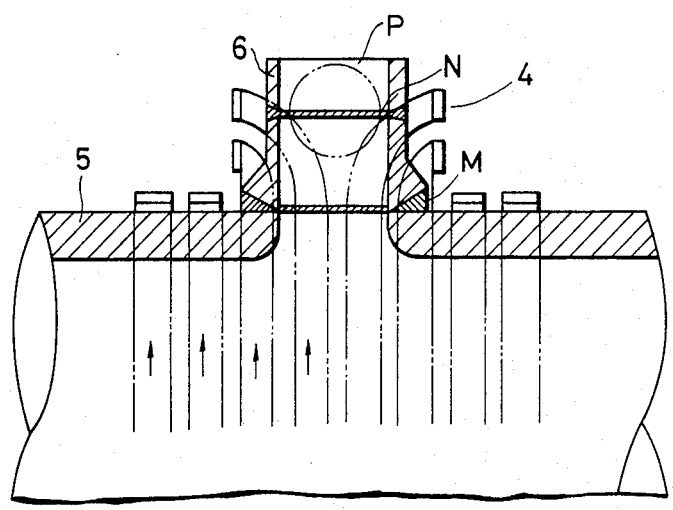
FIG. 3 is a section taken along line X—X of FIG. 2.
Figure 6:
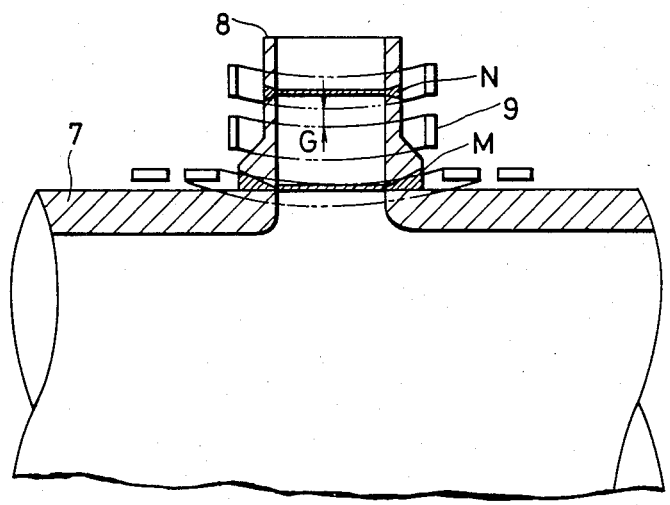
FIG. 6 is a section taken along line Y—Y of FIG. 5.

FIG. 6 is a section taken along line Y—Y of FIG. 5. In view of FIG. 6, the coil 9 is wound concentrically of the desk 8 with having its respective turns spaced a gap G. Especially in case the desk 8 has a weld zone N other than the weld zone M between the desk 8 and the parent pipe 7, it is suggested that the coil be wound at the desk 8 along the weld zone N. Thus, both the weld zones M and N can be uniformly heated so that an abnormal stress can be prevented from being generated by such a local heating treatment as is shown in FIG. 3.

Figure 7:
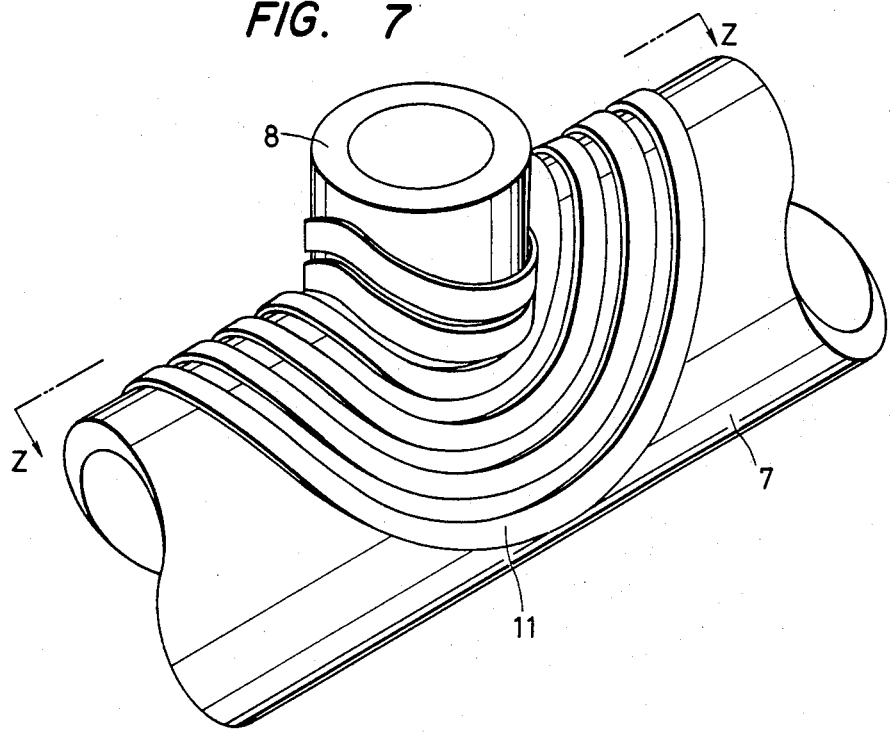
FIG. 7 is a perspective view showing another embodiment of the present invention.
Figure 8:
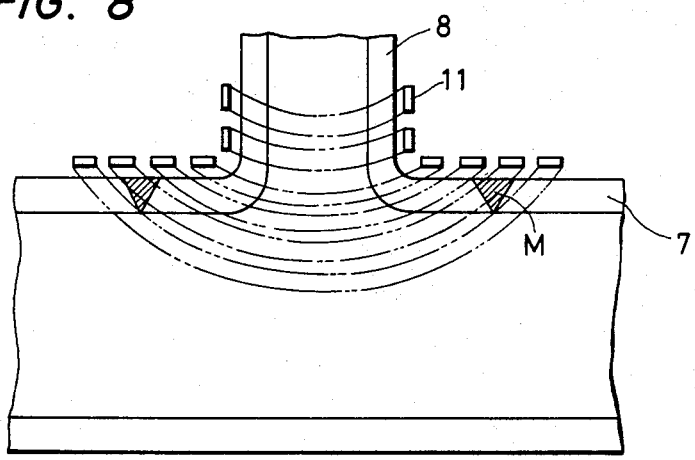
FIG. 8 is a section taken along line Z—Z of FIG. 7.

Next, another embodiment of the present invention will be described with reference to FIGS. 7 and 8. A heating coil 11 shown in FIG. 7 is basically similar in its winding manner to the heating coil 9 shown in FIG. 4 but is different in a coil winding reference. The winding reference of the coil 9 of the embodiment shown in FIG. 4 is located in a plane normal to the axis of the desk 8, whereas the reference of the embodiment of FIG. 7 is located at the weld zone M between the desk 8 and the parent pipe 7. In other words, even on the desk 8, the coil 11 is wound in parallel with the weld zone M. This is because the weld zone M is formed into a shape other than a flat shape, when the parent pipe 7 has a diameter approximately equal to that of the desk 8, so that the weld zone M becomes liable to be offset from the coil center.

Figure 9:
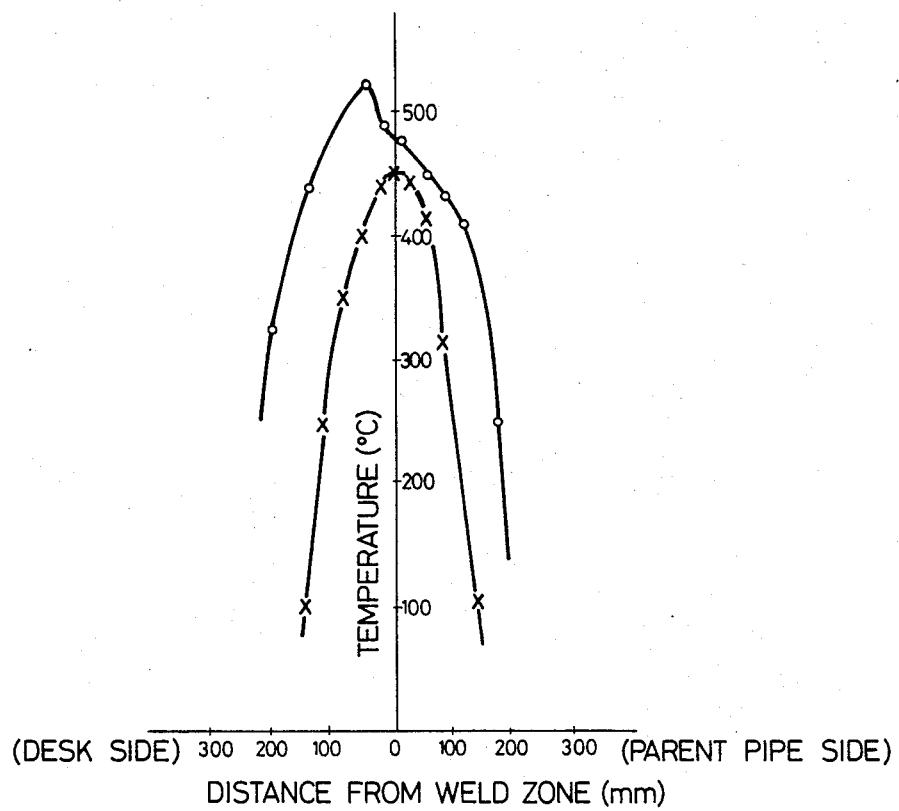
FIG. 9 is a graph comparing the temperature distributions during the heat treatments of the embodiments of FIGS. 4 and 7.

Turning now to FIG. 9, the temperature distributions on the piping under an identical condition are compared for the case (which is indicated by white circles), in which the coil is wound with reference to the flat plane normal to the axis of the desk as in FIG. 4, and the case (which is indicated by letters x), in which the coil is wound with reference to the weld zone between the desk and the parent pipe as in FIG. 7. In view of FIG. 9, it is found that a monotonous tempeature distribution, in which the maximum temperature is realized at the weld zone, can be obtained according to the embodiment of FIG. 7 and that the maximum temperature itself can be suppressed at a low level so that the local heat treatment can be reduced.

Figure 10:
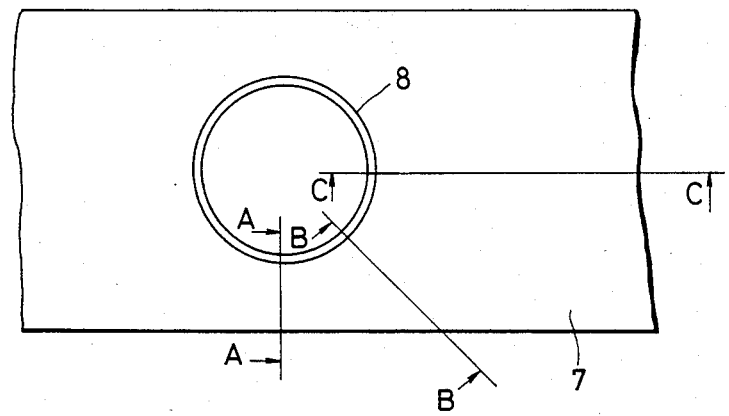
FIG. 10 is a view taken in the axial direction of the pipe welding desk similarly to FIG. 5.
Figure 11:
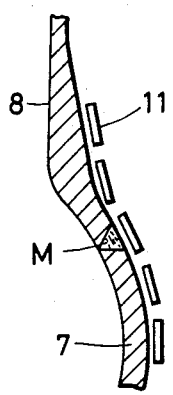
FIGS. 11 to 13 are sections taken along lines A—A, B—B and C—C of FIG. 10, respectively.
Figure 12:
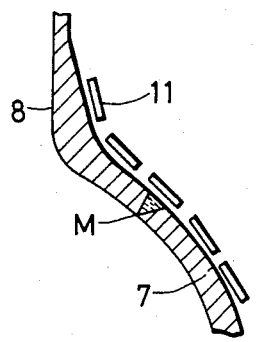
Figure 13:
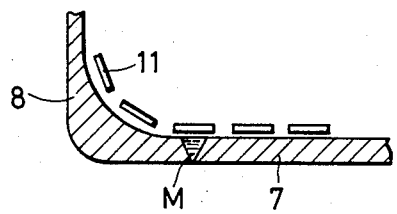

Next, the detailed sectional shape of the heating coil will be examined in the following. As has been described hereinbefore, the weld zone of the desk draws a three-dimentional curve, as is different from the case in which the straight pipes are coaxially jointed. As is apparent from FIGS. 11 to 13 showing the sections taken along lines A—A, B—B and C—C of FIG. 10, respectively, the coil 11 has its wide portions erected generally upright, as shown in FIG. 11 showing the A—A section, whereas the coil 11 is at a generally horizontal position, as shown in FIG. 13 showing the C—C section. On the other hand, the heating coil 11 is constructed of a band-shaped copper plate, which is brought into contact with the outer circumference of the pipe, and a hollow pipe which is soldered to that copper plate by means of a solder.

Because of both the heat generation of the coil itself by the action of the high-frequency induction current and the radiative heat from the surface of the pipe being heated to as high as 550° C., for example, cooling water is introduced into the hollow pipe to prevent the coil from being burned.

The fact that the aforementioned wide portions take their horizontal positions make those portions coincident to the plane in the winding direction. As a result, the winding of the hollow pipe along the pipe generates a large stress in the hollow pipe. If this winding process is conducted by force, cracks are occasionally formed in the hollow pipe to allow the cooling water flowing therein to leak to the outside.

Figure 14:
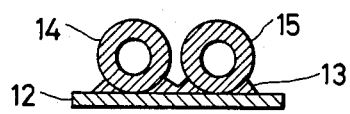
FIG. 14 is a sectional view showing a heating coil according to the present invention.

If this water leakage takes place, the water allowed to leak has radioactivity because the working side is within the reactor accommodating vessel. This is not preferable in the least from the standpoint of contamination with the radioactivity. Because of the use of the large high-frequency current, moreover, there arises a danger of short-circuiting. According to the present invention, therefore, the high-frequency induction heating coil is constructed, as shown in detail in section in FIG. 14, of a band-shaped copper plate 12, which is to abut against the outer circumferences of the desk 8 and the parent tube 7, and circular pipes 14 and 15 which are soldered to that band-shaped copper plate 12 by means of a solder 13. Moreover, those hollow pipes 14 and 15 are fed with cooling water.

Since the high-frequency induction heating coil having the construction thus far described is composed of the circular and hollow pipes, its bending stress is always constant when the coil is to be bent in any direction within a range perpendicular to the center axis thereof. As a result, it is possible to prevent a stress from being concentrated to break the circular and hollow pipes. This makes it possible to prevent the cooling water flowing in that pipe from leaking out, when the pipe is broken, and to eliminate accidents resulting from the contamination with the radioactivity and from the electric short-circuiting.

As has been apparent from the foregoing description, according to the piping system heat-treating method and the heating coil of the present invention, the weld zone between the parent pipe and the pipe welding desk can be uniformly heated all over its range.

What we claim is:

1. A method of heat-treating a weld zone of a piping system, in which the outer wall of a pipe is heated by means of a heating coil, while a coolant is present in said pipe, to establish a temperature difference between the inner and outer walls of said pipe thereby to prevent the weld zone of said pipe from corroding and cracking due to stress,
   wherein the improvement resides in that said heating coil is wound on both a parent pipe of said piping system and at least one weld zone of a pipe welding desk in such a manner that said heating coil is wound over said parent pipe and said pipe welding desk generally concentrically with respect to the axis of said pipe welding desk, whereby the parent pipe and at least one weld zone can be heated, substantially uniformly.

2. A method of heat-treating a weld zone of a piping system as set forth in claim 1, wherein said heating coil is wound generally in parallel with said weld zone.

3. A method of heat-treating a weld zone of a piping system as set forth in claim 1, wherein said pipe welding desk extends at an angle to said parent pipe, thereby forming a complex pipe shape of said parent pipe and pipe welding desk, and whereby, in having said heating coil wound over said parent pipe and pipe welding desk generally concentrically with respect to the axis of said pipe welding desk, the parent pipe and weld zone of the pipe welding desk can be substantially uniformly heated notwithstanding the complex pipe shape.

4. A method of heat-treating a weld zone of a piping system as set forth in claim 3, wherein said pipe welding desk extends at substantially a right angle to said parent pipe.

5. A method of heat-treating a weld zone of a piping system as set forth in claim 1, wherein said pipe welding desk includes at least two weld zones, and wherein said heating coil is wound on said at least two weld zones.

6. Apparatus for heat-treating weld zones of a piping system having a parent pipe and a pipe welding desk, with said pipe welding desk having at least one weld zone, comprising heating coil means for heating the outer wall of said parent pipe and the outer all of at least one weld zone of said pipe welding desk, said heating coil means having a configuration such that the heating coil means can be positioned over said parent pipe and said pipe welding desk generally concentrically with respect to the axis of said pipe welding desk, whereby the parent pipe and at least one weld zone of said pipe welding desk can be heated substantially uniformly.

7. Apparatus for heat-treating weld zones of a piping system according to claim 6, wherein said heating coil means includes a band-shaped plate formed to have said configuration.

8. Apparatus for heat-treating weld zones of a piping system according to claim 7, wherein said band-shaped plate is made of copper.

9. Apparatus for heat-treating weld zones of a piping system according to claim 7, wherein said heating coil means further includes hollow pipe means attached to said band-shaped plate, the hollow pipe means being connected to means for passing a cooling medium through the hollow pipe means to prevent the heating coil means from being burned.

10. Apparatus for heat-treating weld zones of a piping system according to claim 9, wherein said hollow pipe means is circular in cross-section.

11. Apparatus for heat-treating weld zones of a piping system according to claim 6, further comprising means for providing a coolant in said piping system to provide a coolant in said parent pipe and weld zones of said pipe welding desk while the outer walls of said parent pipe and the weld zones are heated by said heating coil means, to establish a tmeperature difference between the inner and outer walls thereof, thereby to prevent weld zones from corroding and cracking due to stress.

12. Apparatus for heat-treating weld zones of a piping system according to claim 11, wherein said heating coil means has a configuration such that coils of the heating coil means are parallel to weld zones.

13. Apparatus for heat-treating weld zones of a piping system according to claim 6, wherein said heating coil means has a configuration such that the heating coil means can be positioned over said parent pipe and said pipe welding desk generally concentrically with respect to the axis of said pipe welding desk when said pipe welding desk extends at an angle to said parent pipe, whereby the parent pipe and weld zone can be substantially uniformly heated notwithstanding the complex pipe shape of the parent pipe and pipe welding desk.

14. Apparatus for heat-treating weld zones of a piping. system according to claim 13, wherein said angle is a right angle.

15. Apparatus for heat-treating weld zones of a piping system according to claim 6, wherein said heating coil means has a configuration such that it extends over at least two weld zones.

16. A coil for heating a weld portion of a piping system, which is adapted to heat a parent pipe and a weld portion of a pipe welding desk while a coolant is present in said parent pipe nad said pipe welding desk, wherein the improvement resides in that the heating coil has such a shape that it can be positioned around the weld portion generally concentrically with respect to the axis of the pipe welding desk.

17. A coil for heating a weld portion of a piping system, which is adapted to heat a parent pipe and a weld portion of a pipe welding desk while a coolant is present in said parent pipe and said pipe welding desk, wherein the improvement resides in that the heating coil is adapted to be wound around the weld portion generally concentrically with respect to the axis of the pipe welding desk, said heating coil being constructed of a plate-shaped member, which is wound on the outer wall of a piping, and having a circular pipe which is fixed to the upper side of said plate-shaped member, and adapted to have a cooling medium flow in said circular pipe.

18. A coil for heating a weld portion of a piping system as set forth in claim 16 or 17, wherein said coil has a shape such that it can be positioned generally in parallel with said weld zone.

19. Structure comprising: (1) a piping system having a parent pipe and pipe welding desk, the pipe welding desk having at least one weld zone; and (2) apparatus for heat-treating weld zones of said pipe welding desk, said apparatus including heating coil means for heating the outer walls of the parent pipe and at least one weld zone of the pipe welding desk, and means for providing a coolant inside the piping system while said heating coil means is heating the outer walls, wherein said heating coil means has a configuration such that the heating coil means is generally concentric with respect to the axis of the pipe welding desk when positioned over the parent pipe and pipe welding desk, whereby the parent pipe and at least one weld zone of the pipe welding desk are heated substantially uniformly.

20. Structure as set forth in claim 19, wherein the pipe welding desk extends at an angle to the parent pipe.

21. Structure as set forth in claim 20, wherein said angle is a right angle.

* * * * *